US012092464B2

(12) United States Patent
DeLuca et al.

(10) Patent No.: US 12,092,464 B2
(45) Date of Patent: Sep. 17, 2024

(54) INDOOR NAVIGATIONAL MAPPING THROUGH PIXEL COLOR MATCHING

(71) Applicant: INTERNATIONAL BUSINESS MACHINES CORPORATION, Armonk, NY (US)

(72) Inventors: Lisa Seacat DeLuca, Bozeman, MT (US); Andrew James Graham Barnes, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 17/302,559

(22) Filed: May 6, 2021

(65) Prior Publication Data

US 2022/0357161 A1    Nov. 10, 2022

(51) Int. Cl.
| | |
|---|---|
| G01C 21/20 | (2006.01) |
| G06F 3/0484 | (2022.01) |
| G06F 18/24 | (2023.01) |
| G06T 7/90 | (2017.01) |
| G06T 11/00 | (2006.01) |

(52) U.S. Cl.
CPC ......... *G01C 21/206* (2013.01); *G06F 3/0484* (2013.01); *G06F 18/24* (2023.01); *G06T 7/90* (2017.01); *G06T 11/001* (2013.01); *G06T 2207/10024* (2013.01)

(58) Field of Classification Search
CPC ......... G06F 18/24; G01C 21/206; G06T 7/90; G06T 11/001; G06T 2207/10024
See application file for complete search history.

(56) References Cited

U.S. PATENT DOCUMENTS

| | | | |
|---|---|---|---|
| 8,594,930 B2 | 11/2013 | Mays | |
| 9,443,447 B2 * | 9/2016 | Bailiang | ............ G09B 29/007 |
| 9,472,004 B2 | 10/2016 | Li | |
| 9,600,930 B2 | 3/2017 | Chen | |
| 11,514,393 B1 * | 11/2022 | Alonso Lopez | ... G06Q 10/0832 |
| 2010/0020093 A1 * | 1/2010 | Stroila | .................. G01C 21/20 |
| | | | 345/589 |

(Continued)

OTHER PUBLICATIONS

Anonymous, "Indoor GPS: How does navigation work without GPS?," indoornavigation.com, [accessed on Jan. 22, 2021], Retrieved from the Internet: <URL: https://www.indoornavigation.com/knowledge/indoor-gps-how-does-navigation-work-without-gps>, 4 pages.

(Continued)

*Primary Examiner* — Andrea C Leggett
(74) *Attorney, Agent, or Firm* — Anthony M. Pallone

(57) ABSTRACT

An embodiment of the invention may include a method, computer program product and system for digital indoor navigation. An embodiment may include determining an area type for each distinct area depicted within the digital indoor mapping image based on an identified color used as a fill for each distinct area. In response to receiving a request for indoor navigation comprising a starting point and a destination point within the image, an embodiment may include determining a navigation path from the starting point to the destination point based on analysis of the request and the determined area types, wherein the navigation path traverses one or more distinct areas depicted within the image based on the identified color.

17 Claims, 6 Drawing Sheets

(56) References Cited

U.S. PATENT DOCUMENTS

2017/0336212 A1 11/2017 Zhao
2018/0347988 A1* 12/2018 Marusco ............ G01C 21/3492
2020/0302510 A1* 9/2020 Chachek ............ G06Q 30/0639

OTHER PUBLICATIONS

Mell et al., "The NIST Definition of Cloud Computing", National Institute of Standards and Technology, Special Publication 800-145, Sep. 2011, 7 pages.
Geospatial World, "What is Indoor Positioning System and how does it work?," YouTube, Jul. 30, 2018, Retrieved from the Internet: <URL: https://www.youtube.com/watch?>.v=rJGI6_crZmw, 3 pages.

* cited by examiner

INDOOR NAVIGATIONAL MAPPING THROUGH PIXEL COLOR MATCHING

BACKGROUND

Embodiments of the present invention relate generally to the field of computing, and more specifically, to indoor positioning systems.

An indoor positioning system (IPS) typically uses a network of devices to locate people or objects where global positioning system (GPS) and other satellite-based technologies lack precision or fail due to the absence of line-of-sight to the satellite. Examples of environments suited for an IPS include, but are not limited to, structural interiors of buildings, airports, train stations, parking garages, and underground locations. A large variety of technologies and devices can be used to provide indoor positioning ranging from reconfigured devices already deployed such as smartphones, WiFi and Bluetooth antennas, and digital cameras; to purpose-built installations with relays and beacons strategically placed throughout a defined space to actively locate mobile devices and tags or provide ambient location or environmental context for devices. IPS has broad applications in commercial, retail, and inventory tracking industries.

BRIEF SUMMARY

An embodiment of the invention may include a method, computer program product and system for digital indoor navigation. An embodiment may include determining an area type for each distinct area depicted within the digital indoor mapping image based on an identified color used as a fill for each distinct area. In response to receiving a request for indoor navigation comprising a starting point and a destination point within the image, an embodiment may include determining a navigation path from the starting point to the destination point based on analysis of the request and the determined area types, wherein the navigation path traverses one or more distinct areas depicted within the image based on the identified color.

DETAILED DESCRIPTION

Figure 1:
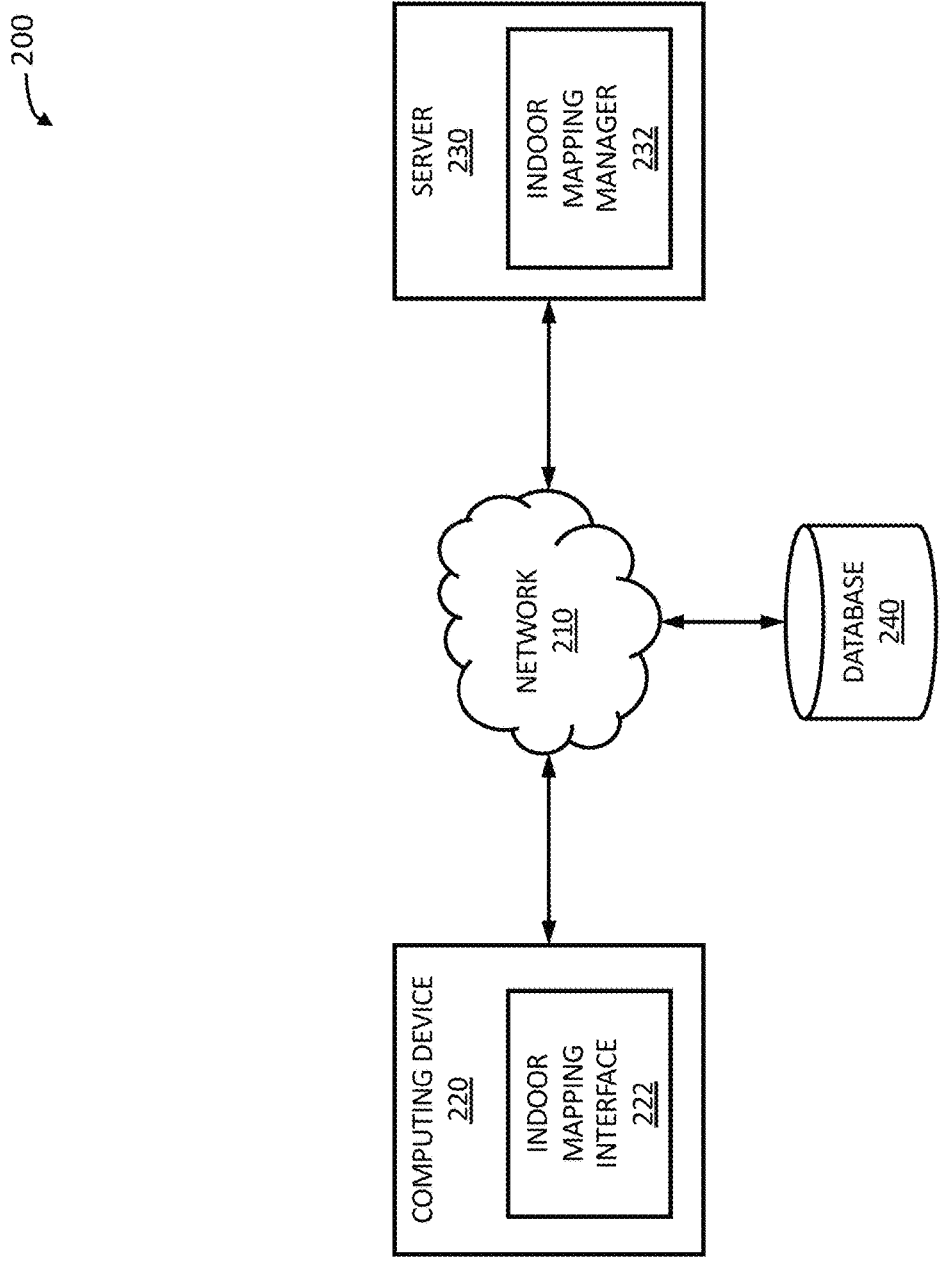
FIG. 1 is a functional block diagram illustrating an indoor mapping system, in accordance with an embodiment of the present invention.

In architecture and building engineering, a floor plan is a drawing to scale, showing a view from above, of the relationships between rooms, spaces, traffic patterns, and other physical features (e.g., structural interiors, interior walls, hallways, windows, doors, etc.) at a level of a structure which may or may not include an outdoor space. Indoor and outdoor navigable routes for a floor plan may frequently change as civic planning progresses or as buildings are remodeled to meet the changing needs of an organization. While there are several commercial systems on the market for indoor navigation, there are no standards for an IPS system. Traditionally, the navigational mapping of such routes is achieved using graphs of nodes and vertices which are generated, overlain, and mapped to paths or areas on a digital map representation of an indoor layout (e.g., a floor plan) of a structure which may or may not include an outdoor space. This process of indoor navigational mapping may generally be pre-generated to make a digital representation of a map (e.g., a floor plan) with navigable routes, and published (e.g. downloaded to a mobile device) to allow navigation across it. However, when there are any real-world changes to the published map or to the outdoor streets/routes, then the representation of the map needs to be re-published to reflect every such change. Additionally, events would need to be dynamically manipulated on the published graph of nodes and vertices overlain on the map every time vertices are subject to the real-world changes (e.g., road works in progress, if part of a building is closed for an event).

Although real-world changes may cause changes to the layout of a map (e.g., a floor plan), mapping providers are consistent in their color coding configurations when publishing indoor and outdoor maps to denote certain map area types or map features such as freeways, streets, parks, rivers, hallways, corridors, stairwells, elevators, rooms, and so on. For example, in an inner space of the map a corridor may be white and in an outer space of the map a road may be white. An outdoor area that could be routed across such as a common or park could be colored green, and conversely indoor open spaces such as a reception/lobby area may be colored in beige. Given this information is regularly updated and published, embodiments of the present invention propose an indoor mapping (IM) system, described below, which uses the coloring of each map area type to identify how to navigate between a starting point and a destination point on a map and adapt to any changes to the map without having to republish a navigation or routing graph every time.

In embodiments of the invention, pixel and/or area colors on a digital indoor mapping image (e.g., an indoor layout of a structure, a floor plan) are used by the IM system for navigation and also for identification of the map area types that are present in the map. As mentioned above, each mapping provider may have a different color coding configuration that would map their standard colors to the map area types present (e.g., roads, hallways, corridors, parks, lawn, lobby, restrooms, etc). The proposed IM system uses this color coding configuration to semantically understand the map at runtime—identify the area types present on the map and determine navigable area types—and allow for navigation based on pre-set rules for each area type on how it may be navigated. For example, color coded corridors can be navigated using an edge and destination proximity searching algorithm until the next logical egress point to another navigable area type or arrival at the destination point. Such use of color coding configurations allows runtime searching without the need to pre-generate a routing graph prior to publication of the latest mapping updates, thereby removing a significant dependency in the publication process and providing a faster time to market for mapping updates. Furthermore, the proposed IM system solves the problem associated with the use of GPS and other satellite-based technologies for indoor navigation, namely, the absence of line-of-sight to the satellite.

Embodiments of the present invention will now be described in detail with reference to the accompanying Figures.

FIG. 1 is a functional block diagram illustrating IM System 200, in accordance with an embodiment of the invention. In an example embodiment, IM System 200 includes one or more computing devices 220 connected via a network 210 to one or more server devices 230. The devices may individually or in concert run one or more applications having programming instructions to perform one or more methods according to embodiments of the invention. An example application includes an indoor mapping or navigation application.

In various embodiments, network 210 is a communication channel capable of transferring data between connected devices. In an example embodiment, network 210 may be the Internet, representing a worldwide collection of networks and gateways to support communications between devices connected to the Internet. Moreover, network 210 may include, for example, wired, wireless, or fiber optic connections which may be implemented as an intranet network, a local area network (LAN), a wide area network (WAN), or any combination thereof. In further embodiments, network 210 may be a Bluetooth network, a WiFi network, or a combination thereof. In general, network 210 can be any combination of connections and protocols that will support an indoor mapping system and may support communications between computing device 220 and server 230.

In an example embodiment, computing device 220 may include indoor mapping interface 222. Computing device 220 may be a laptop computer, a notebook, a tablet computer, a netbook computer, a personal computer (PC), a desktop computer, a personal digital assistant (PDA), a smartphone, a wearable computing device, a smart tv, or any other electronic device or computing system capable of sending, and receiving data to and from other computing devices such as server 230, via network 210, and capable of supporting the functionality required of embodiments of the invention (e.g., executing an indoor mapping request of a user via IM System 200). For example, computing device 220 may support a communication link (e.g., wired, wireless, direct, via a LAN, via the network 210, etc.) between computing device 220 and server 230. Data sent from computing device 220 may include data from indoor mapping interface 222. Data received by computing device 220 may include data sent, via network 210, from server 230, described below. While computing device 220 is shown as a single device, computing device 220 may represent a plurality of computing devices corresponding to a plurality of different users. The users may be, for example, users of an indoor mapping application implemented via IM System 200. Computing device 220 may be described, generally, with respect to FIG. 4 below. In an example embodiment, computing device 220 may send, via network 210, data captured by indoor mapping interface 222 to indoor mapping manager 232 located on server 230. In an example embodiment, computing device 220 may receive data from indoor mapping manager 232 located on server 230.

In an example embodiment, indoor mapping interface 222 may be a program, or subroutine contained in a program, that may operate to receive a request for indoor navigation between a starting point and a destination point on a digital indoor mapping image (e.g., an indoor layout, a floor plan) from a user of computing device 220, interact with indoor mapping manager 232 located on server 230, via network 210, and present, to the user, the map with a navigable path drawn by indoor mapping manager 232 in response to the request. Furthermore, in an example embodiment, indoor mapping interface 222 may also operate to transmit one or more indoor mapping images (e.g., indoor layouts of a structure, floor plans) to indoor mapping manager 232 via network 210 and server 230. The transmitted images may be uploaded to indoor mapping interface 222 by the user of computing device 220. Additionally, indoor mapping interface 222 may receive user navigation/routing preferences and/or accessibility needs (e.g., a ramp requirement, a need to avoid stairs) entered by the user of computing device 220 requesting indoor navigation and transmit the received navigation/routing preferences and/or accessibility needs, as part of the request for indoor navigation, to indoor mapping manager 232 via network 210 and server 230. In an example embodiment, indoor mapping interface 222 may be a user interface for a software application executing a request for indoor navigation via IM System 200. For example, a user of IM System 200 may call upon functions provided by indoor mapping manager 232, via indoor mapping interface 222.

Figure 4:
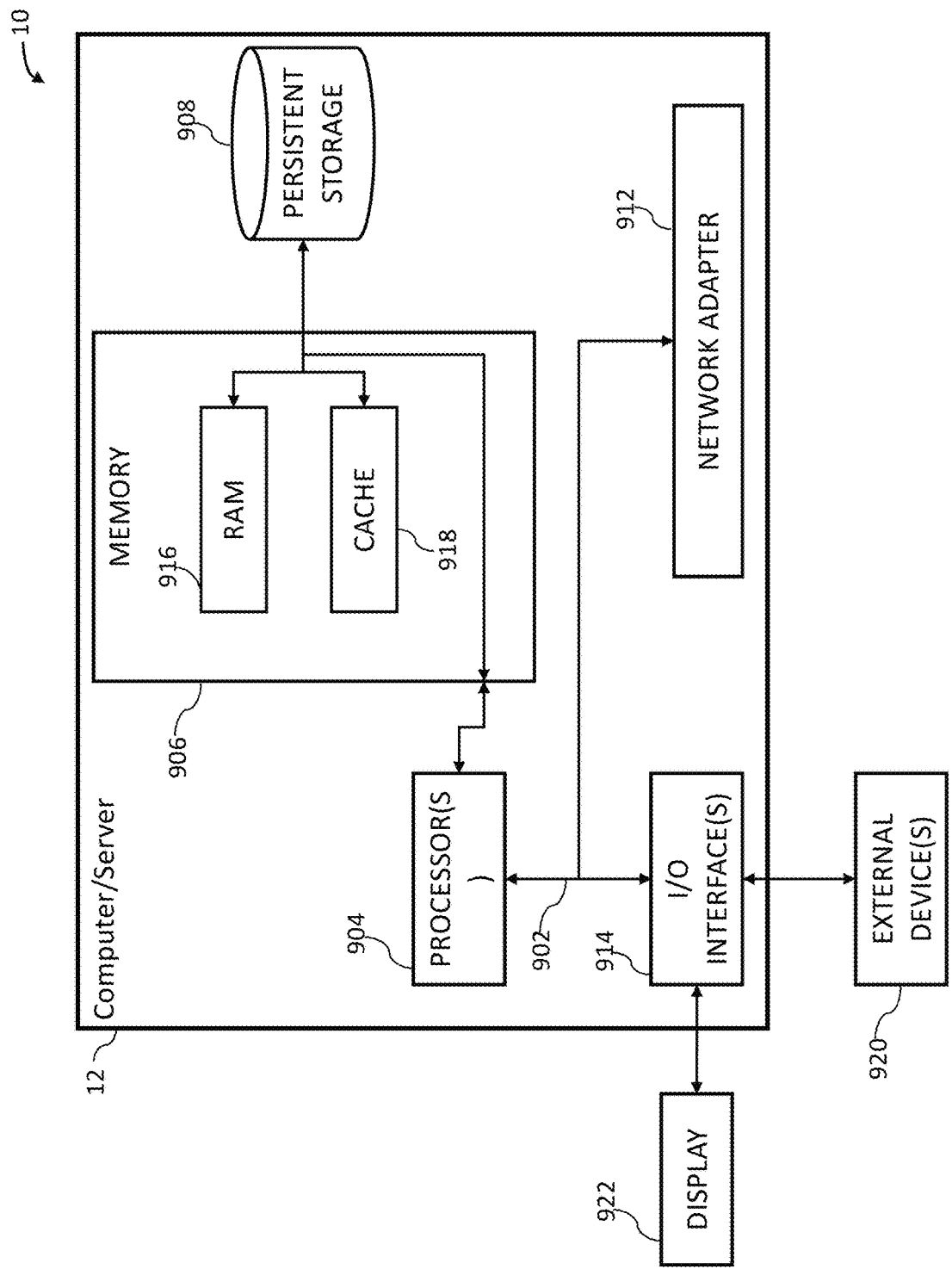
FIG. 4 is a functional block diagram of the hardware components of the indoor mapping system of FIG. 1 and/or a cloud computing node 10, in accordance with an embodiment of the present invention.

In addition, indoor mapping interface 222 may be connectively coupled to hardware components, such as those depicted by FIG. 4, for receiving user input, including mice, keyboards, touchscreens, microphones, cameras, and the like. In an example embodiment, indoor mapping interface 222 is implemented via a web browsing application containing a graphical user interface (GUI) which includes text fields, checkboxes, and buttons necessary for entering a request for indoor navigation by the user of computing device 220 along with navigation/routing preferences and/or accessibility needs of the user. The entered request for indoor navigation and the entered navigation/routing preferences and/or accessibility needs of the user, is transmitted to indoor mapping manager 232 located on server 230, via network 210. In an example embodiment, the GUI for indoor mapping interface 222 also contains a field for presenting, to the user of computing device 220, a map with a navigable path drawn by indoor mapping manager 232 in response to the entered request for indoor navigation. The map with the navigable path is received from indoor mapping manager 232 located on server 230, via network 210. In another embodiment, the operations and functions of indoor mapping interface 222 may be integrated within indoor mapping manager 232 and hosted on server 230.

In an example embodiment, server 230 may include indoor mapping manager 232. Server 230 may be a desktop computer, a notebook, a laptop computer, a blade server, a networked computer appliance, a virtual device, or any other networked electronic device or computing system capable of receiving and sending data from and to other computing devices such as computing device 220, via network 210, and capable of supporting the functionality required of embodiments of the invention. In embodiments of the invention, server 230 may host an indoor navigation application (e.g., indoor mapping manager 232) for execution of user requests for indoor navigation received from indoor mapping interface 222, via computing device 220 and network 210. In an example embodiment, server 230 may function to process data received from computing device 220 via network 210. While server 230 is shown as a single device, in other embodiments, server 230 may represent a cluster or plurality of servers, working together or working separately. Server 230 may be described generally with respect to FIG. 4 below.

In an example embodiment, indoor mapping manager 232 may be a program, or subroutine contained in a program, that may use pixel and/or area colors on a received indoor mapping image (e.g., an indoor layout of a structure, a floor plan) to identify area types present in the map. The map image may have been uploaded to indoor mapping interface 222 and received from indoor mapping interface 222, via computing device 220 and network 210. Further, in response to a user request for navigation between a starting point and a destination point on the map, indoor mapping manager 232 may, in an example embodiment, determine a navigable path between the starting point and the destination point based on any one or combination of attributes of the identified area types and navigation/routing preferences, which may include accessibility needs, of the user received with the request for navigation. Attributes of the identified area types may include, but are not limited to, a terrain of the area type (e.g., grass, tress or landscaping, restroom, room/office, walking path, pavement, gravel, sidewalk, carpet, tile, etc.), whether or not the area type is navigable (e.g., allows foot traffic), an accessibility of the area type, and whether or not the area type is a thru path. Indoor mapping manager 232 may draw the determined navigable path on the received indoor mapping image and transmit the image with the drawn navigable path to the user. In an example embodiment, indoor mapping manager 232 may receive, via computing device 220 and network 210, the request for navigation between the starting point and the destination point entered by the user into indoor mapping interface 222 as well as navigation/routing preferences and/or accessibility needs entered by the user into indoor mapping interface 222. Moreover, in an example embodiment, indoor mapping manager 232 may transmit, via network 210, the map image with the drawn determined navigable path to indoor mapping interface 222 located on computing device 220 for presentation to the user. In another embodiment, the operations and functions of indoor mapping manager 232 may be integrated within indoor mapping interface 222 and hosted on computing device 220. The operations and functions of indoor mapping manager 232 are described in further detail below with regard to FIG. 2.

In an example embodiment, database 240 may be a laptop computer, tablet computer, netbook computer, personal computer (PC), desktop computer, a networked computer appliance, or any other networked programmable electronic device capable of storing data and capable of an exchange of data with other electronic devices (e.g., computing device 220, server 230) through a network (e.g., network 210), in accordance with an embodiment of the invention. In embodiments of the present invention, database 240 may store historical mappings of colors to area types, area type attributes, common color to area type mappings, common navigability to area type mappings, manually input color mappings, and manually input navigability mappings. Additionally, database 240 may store indoor mapping images, uploaded via indoor mapping interface 222, as well as navigation preferences and accessibility needs of users entered into indoor mapping interface 222. The data within database 240 may be retrieved by indoor mapping manager 232 via server 230 and network 210. The data within database 240 may also be retrieved, via network 210, by indoor mapping interface 222, located on computing device 220. Database 240 may be described generally with respect to FIG. 4 below. Additionally, database 240 may represent a plurality of network storage devices. In another embodiment, database 240 may be located within server 230 and/or computing device 220.

Figure 2:
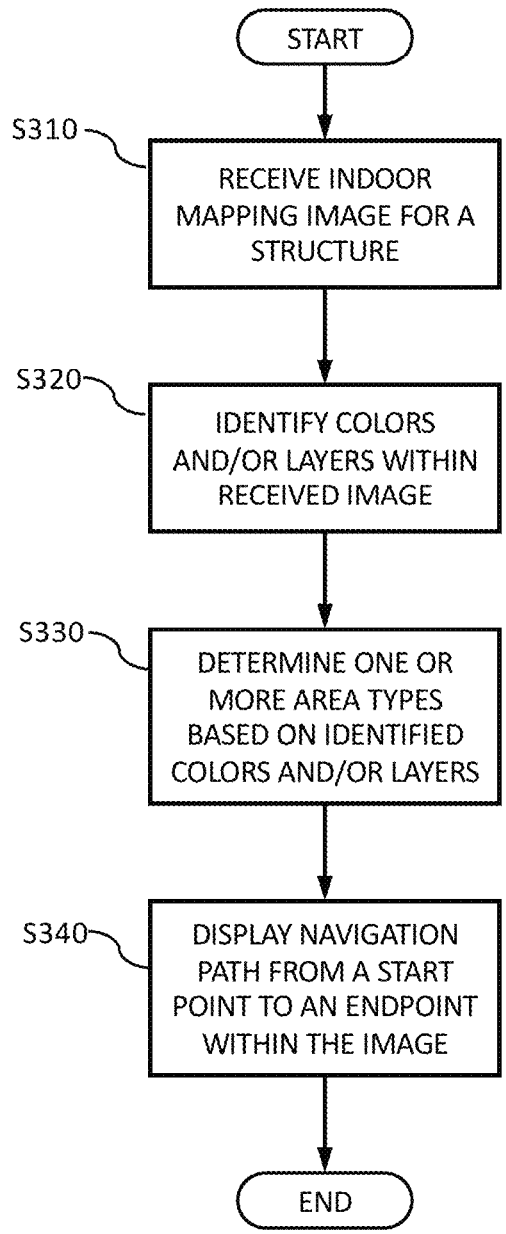
FIG. 2 is a flowchart of a method illustrating the operations of the indoor mapping manager of FIG. 1, in accordance with an embodiment of the present invention.

FIG. 2 shows a flowchart illustrating the operations of indoor mapping manager 232, in accordance with an example embodiment of the invention. Referring to step S310, indoor mapping manager 232 receives at least one digital indoor mapping image (e.g., an indoor space, an indoor layout, a floor plan with structural interiors) for a structure. It should be noted that in the example of a floor plan, the floor plan may include an outdoor space such as, but not limited to, a courtyard. In an example embodiment, the image may have been uploaded by a user to indoor mapping interface 222 and transmitted to indoor mapping manager 232. In another embodiment, the indoor mapping image may have been uploaded to and received from a commercially available indoor mapping solution in which IM System 200 is integrated. Examples of indoor mapping images received by indoor mapping manager 232 may include, but are not limited to: each floor within a facility; landscaping around a building or complex; stadium or venue seating; and asset locations within a manufacturing plant. Furthermore, the received indoor mapping images may be in the format of: computer-aided design (CAD) and building information modeling (BIM) drawings; photo/illustration formats such as: jpeg, png, svg, pdf, and bitmap; and/or a GeoJSON format designed for representing simple geographical features and their nonspatial attributes.

Referring to step S320, in an example embodiment, indoor mapping manager 232 analyzes the received indoor mapping image to identify any pixel colors and/or separate layers which may be present. As noted above, colors may be used as a fill to designate/denote distinct colored areas within an indoor mapping image. In lieu of colors, or in addition to, layers within an indoor mapping image may also be used to designate/denote distinct areas within the indoor mapping image. Indoor mapping manager 232 may assign any identified layers within the received indoor mapping image with one or more different colors. Moreover, in a situation where layers designating distinct areas within an indoor mapping image are present but colors are not, indoor mapping manager 232 may color any identified layer within the image with an assigned color. It is noted that if no colors are found or the layers are not separated adequately by area type, indoor navigation may be performed without the use of embodiments of the invention using known point-to-point and coordinate systems.

In another embodiment, in lieu of colors, or in addition to, patterns within an indoor mapping image may be used as a fill to designate distinct areas within the indoor mapping image. Indoor mapping manager 232 may assign any identified patterns within the received indoor mapping image with one or more different colors based on historical mappings of colors to patterns, common color to pattern mappings, and/or manually input color to pattern mappings. Indoor mapping manager 232 may then determine an area type for each identified pattern based on its assigned color.

Referring to step S330, in an example embodiment, indoor mapping manager 232 determines one or more area types present within the received indoor mapping image based on the colors and/or separate layers identified in step S320. Indoor mapping manager 232 may determine and associate an area type for each colored area within the image based on a designating color identified in step S320. If layers are identified that separate distinct areas within the indoor mapping image, indoor mapping manager 232 may assign a color to each identified layer based on historical mappings of colors to layers, common color to layer mappings, and/or manually input color to layer mappings. Indoor mapping manager 232 may then determine an area type for each identified layer based on its assigned color. In analyzing the colors to determine the area types present within the indoor mapping image, indoor mapping manager 232 may use any one or combination of: historical mappings of colors to area types; foot traffic attributes of similar colored area types from other indoor mapping image uploads; common color to area type mappings; and manually input color mappings from a system administrator (e.g., a mapping of green→grass). Examples of common colors to area type mappings may include: green→grass; dark green→trees or landscaping; blue→restroom; light gray→walking path; and dark grey→room/office.

With continued reference to step S330, in an example embodiment, indoor mapping manager 232 may additionally determine whether the determined area types are navigable, meaning they allow foot traffic and are therefore walkable, or not navigable, meaning they block foot traffic and are therefore not walkable. In making this determination of navigability, indoor mapping manager 232 may use any one or combination of: attributes of similar colored area types from other indoor mapping image uploads; common navigability to area type mappings; and manually input navigability mappings from a system administrator. Examples of common navigability to area type mappings may include: grass→walkable; trees or landscaping→not walkable; restroom→walkable but typically not a thru path; walking path→walkable; and room/office→walkable with one or more entry/exit but typically not a thru path.

It is noted that the above mentioned historical mappings, area type attributes, common color to area type mappings, common navigability to area type mappings, manually input color mappings, and manually input navigability mappings may be stored within database 240 of IM System 200 which, in an example embodiment, is accessible by indoor mapping manager 232 via server 230 and network 210.

Referring to step S340, in an example embodiment, in response to a received request for indoor navigation from a starting point to a destination point within the received indoor mapping image, indoor mapping manager 232 displays/draws, on the received indoor mapping image, a navigation path from the starting point to the destination point based on analysis of the received request and the area types determined in step S330. In drawing the navigation path, image mapping manager 232 begins at the starting point and analyzes the received image to locate at least one determined area type that is connected to the starting point and allows for foot traffic as analyzed above. If the located area type allows for foot traffic, indoor mapping manager 232 draws the navigation path along the colored area associated with the located area type allowing foot traffic leading to the destination point choosing the shortest route available from the starting point. In another embodiment, indoor mapping manager 232 may draw the navigation path along the colored area associated with the located area type allowing foot traffic leading to the destination point choosing the fastest route available from the starting point.

With continued reference to step S340, if before the destination point is reached the located area type stops or transitions to another colored area (connected to the colored area associated with located area type) which is associated with a different area type, that next colored area may also be analyzed as above, by indoor mapping manager 232, to determine if foot traffic is allowed within the different area type. In an example embodiment, indoor mapping manager 232 may display the received indoor mapping image with the drawn navigation path to the user via indoor mapping interface 222. If no navigation path is found from the starting point to the destination point, indoor mapping manager 232 may notify, via indoor mapping interface 222, the user that navigational instructions are not allowed.

Figure 3:
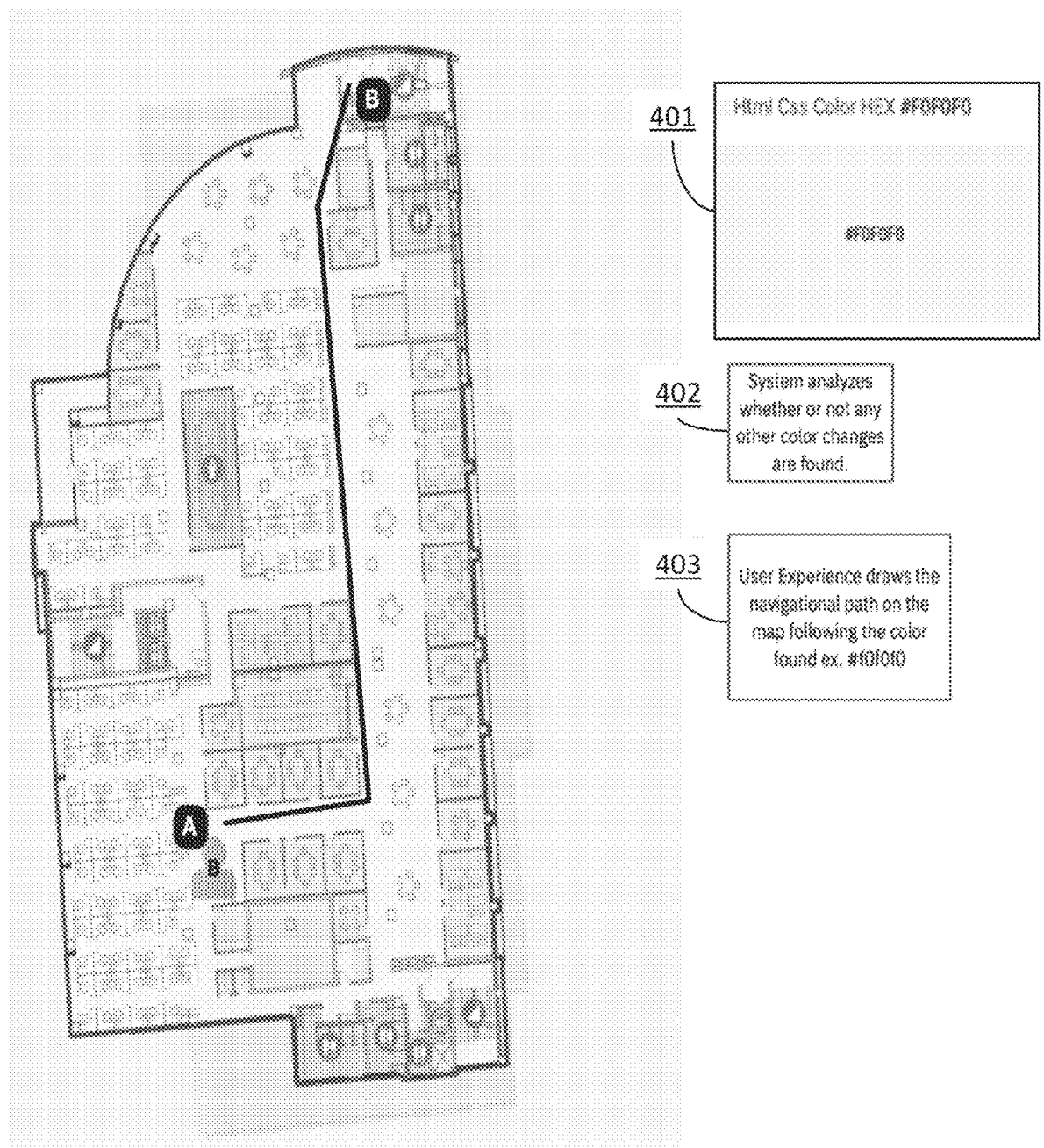
FIG. 3 is an exemplary navigation path output resulting from implementation of the indoor mapping system of FIG. 1, in accordance with an embodiment of the present invention.

As an illustrative example of IM System 200, FIG. 3 depicts an indoor mapping (e.g., an indoor space, a floor plan with structural interiors) image with a drawn navigation path as presented to a user, Bob, via a graphic user interface of IM System 200, in accordance with an embodiment of the present invention. The depicted indoor mapping image with the drawn navigation path may be the result in a scenario in which Bob is at an office location and needs to navigate from a starting point, such as his assigned desk, to a destination point, such as the restroom. Bob may be using a commercially available workplace management solution, such as IBM TRIRIGA® (TRIRIGA and all TRIRIGA-based trademarks and logos are trademarks or registered trademarks of International Business Machines Corporation and/or its affiliates), in which IM System 200 may be implemented. The workplace management solution and the connected office floor plan indicate the restrooms nearest Bob are occupied and consequently recommend using the restroom farther away. According to embodiments of the invention, IM System 200 identifies that HEX color #F0F0F0 is common from where Bob is to where he needs to be and is mapped to a walkable area type (i.e., a navigable area type). IM System 200 also checks if there is a break or stop of the HEX color #F0F0F0, in this case there isn't. Therefore, IM System 200 draws a direct path (i.e., navigable route) for Bob along that HEX color #F0F0F0 having the shortest navigational directions from his starting point to the destination point. Referring now to FIG. 3, the interface includes a starting point A and a destination point B. At 401, IM System 200 identifies color HEX #F0F0F0 as reflected in an html CSS file. At 402, IM System 200 determines navigability for colors (i.e., navigability for the area types the colors are mapped to) in the image and analyzes whether or not any other colors changes are found. At 403, IM System 200 draws the navigational path on the indoor mapping image following the color found, such as #F0F0F0.

The following are additional considerations according to various embodiments of the invention. In embodiments of the invention, the presence of a continuous colored area between a starting point (A) and a destination point (B) may not always mean that it is the most optimal navigation path. It merely means the user can stay on the colored area during navigation from A to B. Consequently, in embodiments of the invention, indoor mapping manager 232 may use two or more colored areas to find an optimal path between points A and B, as long as both area types associated with the colored areas are determined navigable (i.e., walkable). In embodiments of the invention, an optimal navigation path may be a shortest path, a fastest path, and/or a path based on preferences/needs of the user. The user might have navigation preferences such as avoiding exposed and/or outdoor paths or avoiding specified terrains (e.g., rocks, grass). For example, in a scenario a green colored area is found and mapped to a walkable area type of "grass", indoor mapping manager 232 may nevertheless ignore that colored area and give preference/prioritization to a gray colored area mapped to a walkable area type of "sidewalk". In embodiments of the invention, navigation preferences of the user may also include time-bound preferences. For example, the user may not want to walk on a green colored area mapped to a walkable area type of "grass" before LOAM so as to avoid dew. As another example, the user may want to avoid any walkable area types (e.g., an outdoor courtyard) after a particular hour. Additionally, in embodiments of the invention, indoor mapping manager 232 may consider accessibility needs of a user. For example, if an area representing stairs are colored differently within an indoor mapping image, then that colored area could be avoided (despite being mapped to a walkable area type) for navigation by indoor mapping manager 232 if a user's accessibility needs required an accessible path. Moreover, areas representing accessibility ramps (being mapped to a walkable area type) may also be colored differently within an indoor mapping image thereby allowing prioritization to be given by indoor mapping manager 232 to that colored area when determining navigation paths for a user with accessibility needs.

Also, in other embodiments of the invention, indoor mapping manager 232 may consider current local weather conditions (accessible from an internet weather service) when determining a navigation path for a user. For example, in a scenario where the local weather conditions include precipitation, temperature below a certain degree, and/or temperature above a certain degree, indoor mapping manager 232 may prioritize a navigation path that uses only colored areas mapped to indoor walkable area types and avoids colored areas mapped to outdoor or exposed walkable area types (e.g., a courtyard, an open air walkway). Similarly, in other embodiments, indoor mapping manager 232 may consider any obstacles identified within an indoor mapping image, or any obstacles identified by a commercially available workplace management solution in which IM System 200 is implemented, when determining a navigation path for a user. For example, indoor mapping manager 232 may avoid a colored area which is mapped to a walkable area type in response to determining that the colored area is blocked by an identified obstacle.

FIG. 4 is a block diagram of components of computing device 220, server 230, and/or an illustrative cloud computing node, according to an embodiment of the invention. It should be appreciated that FIG. 4 provides only an illustration of one implementation and does not imply any limitations with regard to the environments in which different embodiments may be implemented. Many modifications to the depicted environment may be made. Furthermore, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove (for example, in connection with FIGS. 1-3, above).

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computing device 220, server 230 and computer system/server 12 is shown in the form of a general-purpose computing device. Computing device 220, server 230 and computer system/server 12 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

Communications fabric 902 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The programs indoor mapping interface 222 in computing device 220; and indoor mapping manager 232 in server 230 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs indoor mapping interface 222 in computing device 220; and indoor mapping manager 232 in server 230 may be downloaded to persistent storage 908 through network adapter 912.

I/O interface(s) 914 allows for input and output of data with other devices that may be connected to computing device 220 and server 230. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs indoor mapping interface 222 in computing device 220; and indoor mapping manager 232 in server 230, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
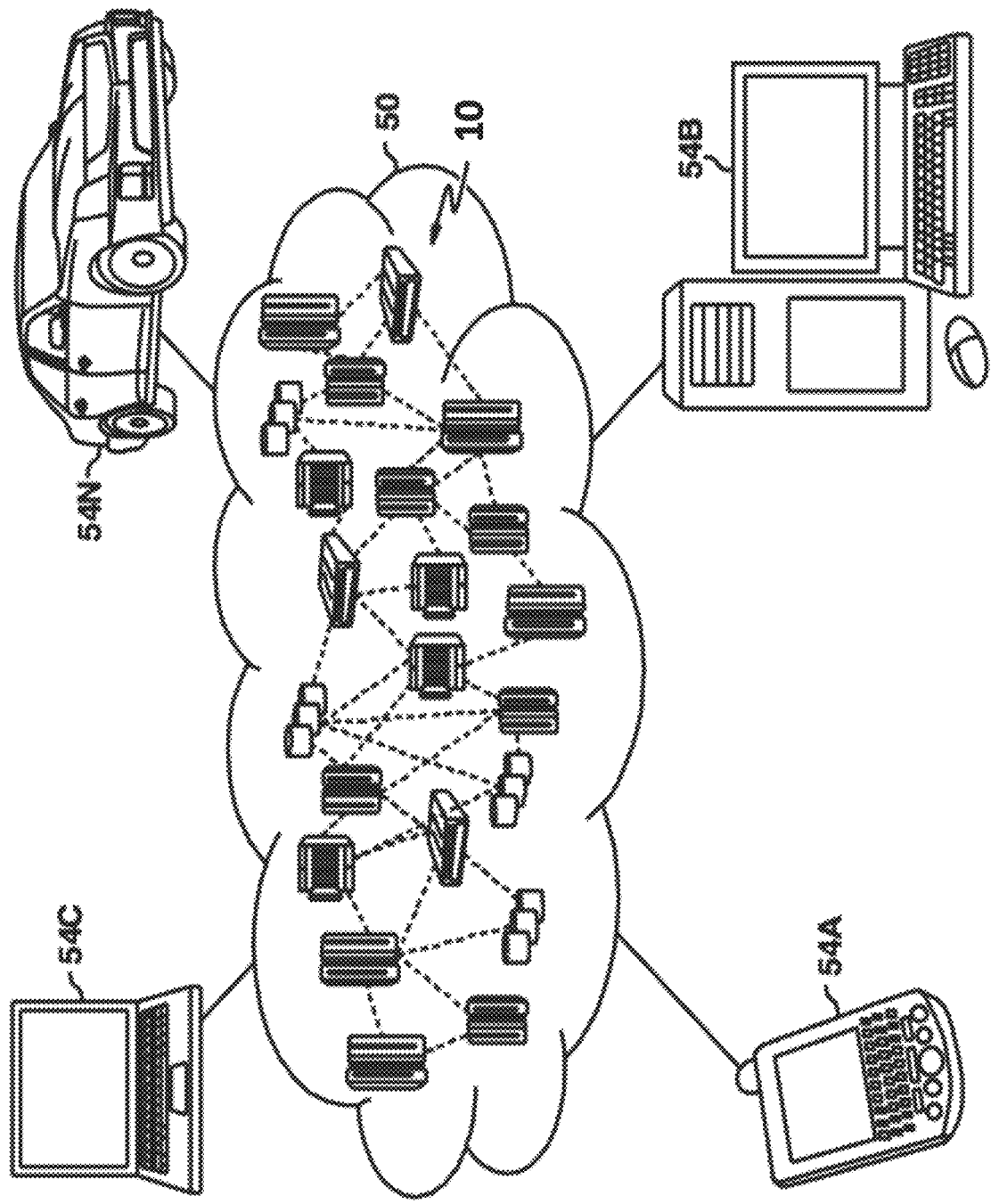
FIG. 5 is a functional block diagram of a cloud computing environment 50 including cloud computing node 10 of FIG. 4, in accordance with an embodiment of the present invention.

FIG. 5 is a block diagram of a cloud computing environment including the cloud computing node of FIG. 4, according to an embodiment of the invention. Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
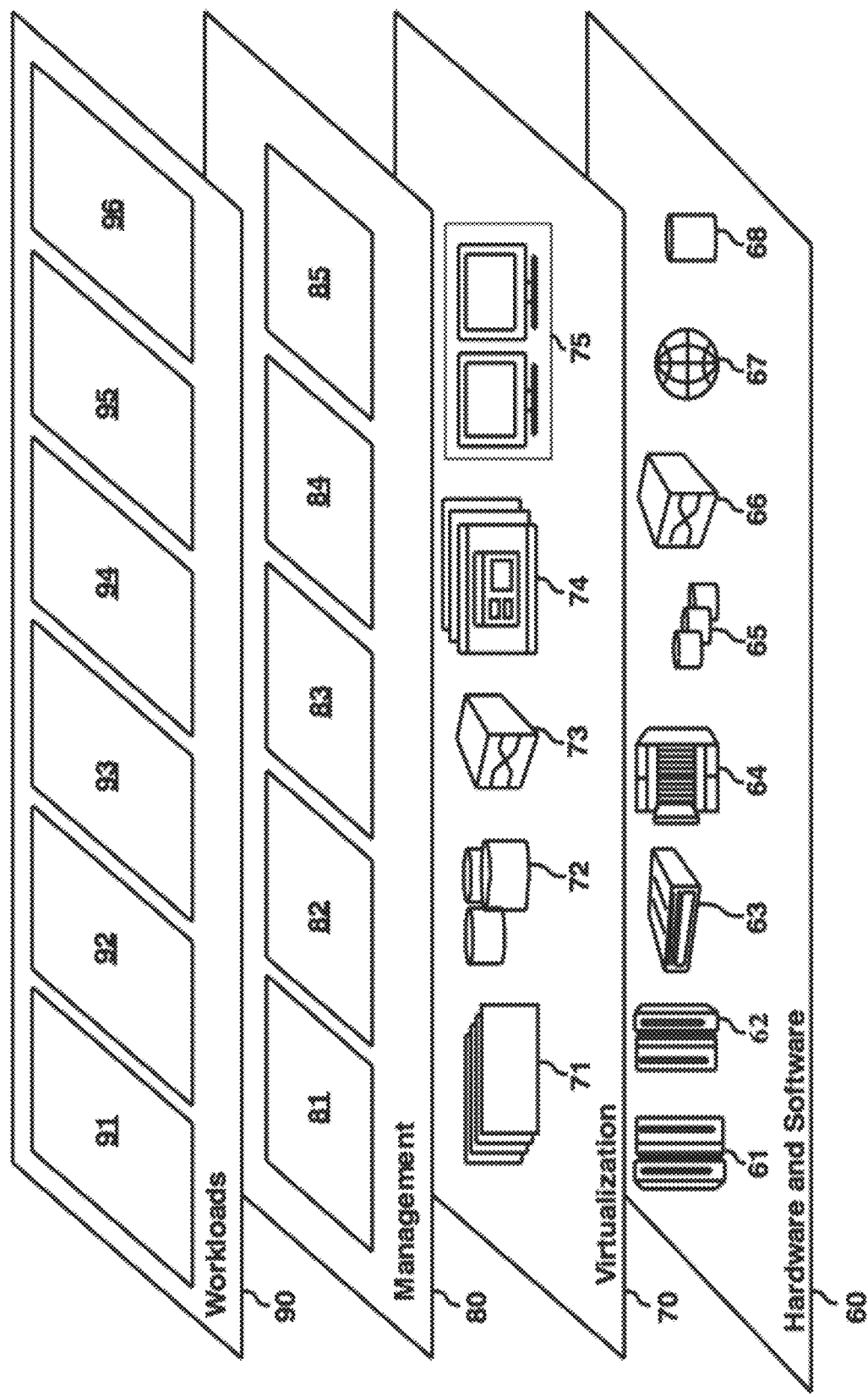
FIG. 6 is a functional block diagram of management and operational layers of cloud computing environment 50 of FIG. 5, in accordance with an embodiment of the present invention.

FIG. 6 is a block diagram of functional layers of the cloud computing environment of FIG. 5, according to an embodiment of the invention. Referring now to FIG. 6, a set of functional abstraction layers provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and indoor mapping system 96. Indoor mapping system 96 may relate to providing an indoor navigation between two points on a digital indoor map based, in part, on identified pixel colors of the map.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer implemented method for digital indoor navigation, the method comprising:
   receiving a digital indoor mapping image comprising structural interiors of a building;
   determining an area type for each distinct area depicted within the digital indoor mapping image based on an identified color used as a fill for each distinct area;
   determining a navigability for each distinct area within the digital indoor mapping image based on its determined area type and based on attributes of similar colored area types from other indoor mapping image uploads accessed from a remote database, wherein a navigability determination for a distinct area is either walkable or not walkable; and
   in response to receiving a request for indoor navigation comprising a starting point and a destination point within the digital indoor mapping image, determining a navigation path from the starting point to the destination point based on analysis of the request and the determined navigability for each distinct area, wherein the navigation path is drawn on the digital indoor mapping image and traverses one or more distinct areas depicted within the digital indoor mapping image having a walkable navigability determination.

2. The method of claim 1, wherein the navigation path comprises the shortest route available between the starting point and the destination point.

3. The method of claim 1, further comprising:
in response to the at least one distinct area transitioning to a next distinct area before the navigation path reaches the destination point, analyzing the next distinct area to determine its navigability.

4. The method of claim 1, further comprising:
identifying one or more layers within the received digital indoor mapping image, wherein each identified layer designates a distinct area within the image;
assigning each identified layer with a color;
coloring each identified layer within the image with its assigned color;
determining an area type for each identified layer based on its assigned color; and
determining a navigability for each identified layer within the image based on its determined area type.

5. The method of claim 1, wherein the request for indoor navigation is received from a user, and wherein the request for indoor navigation further comprises navigation preferences and/or accessibility needs of the user, and wherein display of the navigation path gives prioritization to the navigation and/or accessibility needs of the user.

6. The method of claim 1, further comprising:
providing to a user, via a graphic user interface, the determined navigation path displayed along at least one distinct area within the image, wherein the at least one distinct area within the image is connected to the starting point.

7. A computer program product for digital indoor navigation, the computer program product comprising:
one or more non-transitory computer-readable tangible storage medium and program instructions stored on at least one of the one or more non-transitory computer-readable tangible storage medium, the program instructions executable by a processor capable of performing a method, the method comprising:
receiving a digital indoor mapping image comprising structural interiors of a building;
determining an area type for each distinct area depicted within the digital indoor mapping image based on an identified color used as a fill for each distinct area;
determining a navigability for each distinct area within the digital indoor mapping image based on its determined area type and based on attributes of similar colored area types from other indoor mapping image uploads accessed from a remote database, wherein a navigability determination for a distinct area is either walkable or not walkable; and
in response to receiving a request for indoor navigation comprising a starting point and a destination point within the digital indoor mapping image, determining a navigation path from the starting point to the destination point based on analysis of the request and the determined navigability for each distinct area, wherein the navigation path is drawn on the digital indoor mapping image and traverses one or more distinct areas depicted within the digital indoor mapping image having a walkable navigability determination.

8. The computer program product of claim 7, wherein the navigation path comprises the shortest route available between the starting point and the destination point.

9. The computer program product of claim 7, further comprising:
in response to the at least one distinct area transitioning to a next distinct area before the navigation path reaches the destination point, analyzing the next distinct area to determine its navigability.

10. The computer program product of claim 7, further comprising:
identifying one or more layers within the received digital indoor mapping image, wherein each identified layer designates a distinct area within the image;
assigning each identified layer with a color;
coloring each identified layer within the image with its assigned color;
determining an area type for each identified layer based on its assigned color; and
determining a navigability for each identified layer within the image based on its determined area type.

11. The computer program product of claim 7, wherein the request for indoor navigation is received from a user, and wherein the request for indoor navigation further comprises navigation preferences and/or accessibility needs of the user, and wherein display of the navigation path gives prioritization to the navigation and/or accessibility needs of the user.

12. The computer program product of claim 7, further comprising:
providing to a user, via a graphic user interface, the determined navigation path displayed along at least one distinct area within the image, wherein the at least one distinct area within the image is connected to the starting point.

13. A computer system for indoor navigation, the system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a digital indoor mapping image comprising structural interiors of a building;
determining an area type for each distinct area depicted within the digital indoor mapping image based on an identified color used as a fill for each distinct area;
determining a navigability for each distinct area within the digital indoor mapping image based on its determined area type and based on attributes of similar colored area types from other indoor mapping image uploads accessed from a remote database, wherein a navigability determination for a distinct area is either walkable or not walkable; and
in response to receiving a request for indoor navigation comprising a starting point and a destination point within the digital indoor mapping image, determining a navigation path from the starting point to the destination point based on analysis of the request and the determined navigability for each distinct area, wherein the navigation path is drawn on the digital indoor mapping image and traverses one or more distinct areas depicted within the digital indoor mapping image having a walkable navigability determination.

14. The computer system of claim 13, wherein the navigation path comprises the shortest route available between the starting point and the destination point.

15. The computer system of claim 13, further comprising:
in response to the at least one distinct area transitioning to a next distinct area before the navigation path reaches the destination point, analyzing the next distinct area to determine its navigability.

16. The computer system of claim 13, further comprising:
identifying one or more layers within the received digital indoor mapping image, wherein each identified layer designates a distinct area within the image;
assigning each identified layer with a color;
coloring each identified layer within the image with its assigned color;
determining an area type for each identified layer based on its assigned color; and
determining a navigability for each identified layer within the image based on its determined area type.

17. The computer system of claim 13, wherein the request for indoor navigation is received from a user, and wherein the request for indoor navigation further comprises navigation preferences and/or accessibility needs of the user, and wherein display of the navigation path gives prioritization to the navigation and/or accessibility needs of the user.

\* \* \* \* \*